Nov. 5, 1929.  J. H. GODFREY  1,734,569
VALVE
Filed July 6, 1926
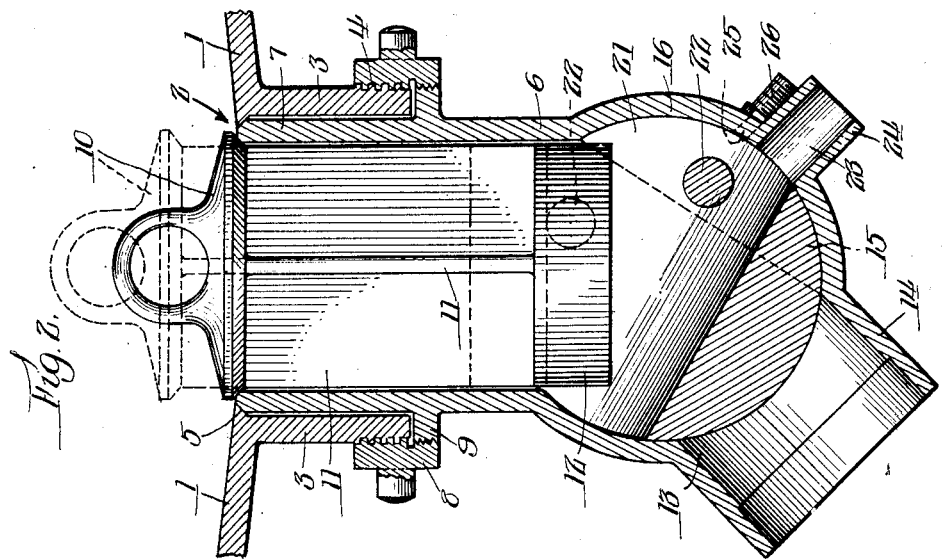
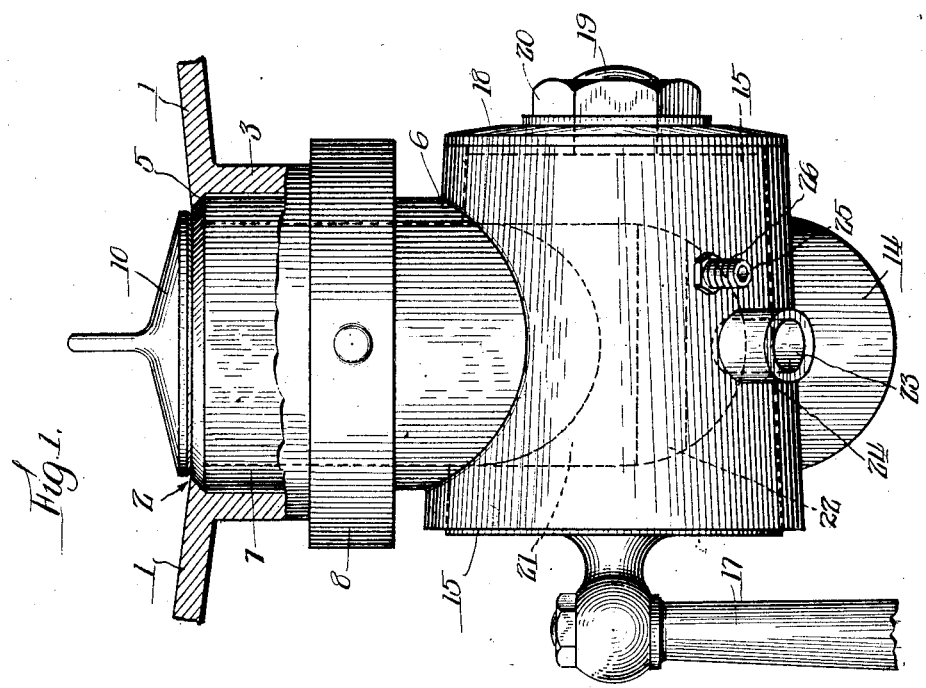
Inventor
Joseph H. Godfrey,
By Hewitt S. Dixon Atty.

Patented Nov. 5, 1929

1,734,569

UNITED STATES PATENT OFFICE

JOSEPH H. GODFREY, OF CHICAGO, ILLINOIS, ASSIGNOR TO THE CREAMERY PACKAGE MFG. COMPANY, OF CHICAGO, ILLINOIS, A CORPORATION OF ILLINOIS

VALVE

Application filed July 6, 1926. Serial No. 120,607.

The invention relates to valves for the control of the flow of edible fluids and known as sanitary valves.

In the preparation of milk for food consumption, one of the processes employed is pasteurization by which the pathogenic bacteria are destroyed. The common method of pasteurization is to hold quantities of milk at a predetermined temperature for a predetermined time in insulated or heated containers of large capacity. The milk is ordinarily treated in successive batches, the containers being filled and emptied through sanitary piping controlled by sanitary valves positioned at the inlets and outlets of the containers. It will be obvious that any leakage or failure in these valves will permit the uncontrolled flow through the container of a quantity of milk which has not been held for the required time at the necessary temperature. If such leakage is permitted to pass into the discharge conduits with the properly pasteurized milk, the latter is in danger of reinoculation by the undestroyed bacteria in the milk which has escaped the prescribed treatment.

Also it is obviously necessary that all containers, piping and controlling valves used in the treatment of milk for food consumption be kept in a sanitary condition. More especially the controlling valves, with their necessary operative parts increasing the possibility for the retention of milk, are susceptible of contamination, and it is essential that these valves be kept in a clean and sterile condition, preferably being sterilized periodically during the operation of the apparatus. It is further desirable that all parts of the apparatus, having contact with the milk, be constructed so that the parts may be readily disassembled for thorough cleaning after their operative use.

It is the principal object of this invention to provide an improved sanitary valve having provision for the diversion outwardly from the main passages of any leakage occurring in the valve when it is in closed position. Another object is to provide means for sterilizing the valve chamber while the valve is in closed position during the periods between the discharge of successive batches of the contents of the container being controlled. A further object is to provide a valve having these characteristics and of simple construction, having few parts which may be conveniently and quickly taken down for cleaning.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claim.

Referring to the drawings, Fig. 1 represents an elevation of the valve structure, mounted in a fractional portion of the bottom wall of a container partially cut away to expose the upper end of the valve casing. Fig. 2 is a sectional elevation of the device, illustrating the construction of the valve members.

The reference numeral 1 indicates a wall of a container or tank, suitable for the treatment of milk or other edible fluid, and having an opening through the wall indicated at 2. A flange 3 is preferably secured to or integral with the wall outwardly of the tank about the opening, and threaded at its outer end as at 4 for the attachment of the controlling valve. The marginal portion of the tank wall about the opening is preferably flared inwardly to form an angularly faced seat 5 to receive in sealed abutment the end of the valve casing structure. A valve casing 6 is constructed with a sleeve portion 7 adapted to enter the flange 3 and bear at its end upon the seat 5 formed in the wall of the tank, forming therewith a substantially flush joint with the inner surface of the tank wall. The casing 6 may be secured in position by means of a union coupling 8 having threaded engagement with the end of the flange 3 and also in threaded engagement with a ring 9 fixed on the casing 6.

The open end of the sleeve portion 7 of the casing is in communication with the tank interior, forming the discharge outlet therefrom, and forming also the inlet opening to the casing chamber which constitutes the normal passage for the discharging liquid through the valve structure. The inlet opening to the casing chamber or normal passage is controlled by a valve 10, positioned at the end of the sleeve portion 7 of the casing. The valve 10 is preferably of the reciprocatory type, commonly known as a poppet valve, having a conical seat in the end of the casing. The valve 10 is preferably provided with guide wings 11 extending into the adjacent sleeve portion of the casing, and having at their ends a connecting ring 12.

An outlet opening 13 is provided in the opposite end of the casing, the latter having a sleeve extension 14 provided about the outlet to receive suitable piping for conducting the discharged liquid. The outlet 13 is controlled by a rotary type valve 15, commonly known as a plug valve, having its tapered seat 16 in the adjacent portion of the casing formed suitably therefor, and arranged with its axis substantially perpendicular to the longitudinal axis of the inlet valve 10. The valve 15 may be operated by timed mechanical means for automatically discharging the tank contents at predetermined intervals, but for simplicity of illustration herein a handle 17 is shown for the manual operation of the valve. The valve 15 is retained in its seat preferably by means of an end plate 18 bearing upon the margin of the casing, and through which a stem 19 extends from the plug 15 to receive a retaining nut 20 bearing upon the plate 18.

The valve plug 15 is provided with a deep U-shaped lateral recess 21, so arranged that the plug may be turned to position the recess to establish open communication between the inlet portion of the casing and the casing outlet opening 13, the solid portion of the plug effecting the closure of the outlet opening when the plug is turned to closing position, as illustrated in Fig. 2. The plug valve 15 and poppet valve 10 are designed to be operated concurrently to open and close the normal fluid discharge passage through the valve casing, and provision is made for the operation of the poppet valve by the operating movement of the plug valve. This is accomplished by means carried by the valve plug 15 and herein illustrated as a cross bar 22 mounted within the recess 21 and supported upon the sides thereof. The bar 22 is positioned to engage the ring 12 carried by the guide wings of the poppet valve, and with the opening movement of the plug valve it operates to lift the poppet valve from its seat coincidently with the uncovering of the outlet opening 13, as illustrated in broken lines in Fig. 2. The reverse movement of the valve plug permits the poppet valve to return to its seat in closure of the inlet opening coincidently with the closing of the casing outlet opening.

To accomplish the diversion from the normal passage or chamber in the casing between the inlet and outlet valves, of any leakage which might occur past either of the valves when in closed position, there is provided an auxiliary passage 23 extending through the seat 16 of the plug valve and forming a port therein, the casing wall being preferably provided with a nipple 24 suitable to discharge such leakage into a collecting receptacle. The port opening to the auxiliary passage 23 is so positioned in the valve seat that when the plug valve is in closed position the bottom portion of the recess 21 is preferably inclined toward and drains directly into the auxiliary passage 23, and any leakage through the valves will flow freely outward of the casing chamber. When the plug valve 15 is operated to open the normal outlet passage, the solid section of the plug moves over the port opening to the auxiliary passage 23 and effects the closure thereof before opening the inlet valve 10, thus preventing a wastage of the properly treated fluid in its normal discharge through the casing.

Provision is also made for the sterilization of the interior of the valve casing and the enclosed valve parts, while the valves are in closed position, by means of live steam or other suitable sterilizing fluid introduced into the chamber through an inlet passage 25, also forming a port in the seat of the plug valve and communicating with a nipple 26 mounted in the wall of the casing and suitable for the attachment of a supply pipe leading to a source of sterilizing fluid. The sterilizing fluid inlet passage 25 is so positioned that when the valve plug 15 is in closed position, the port opening to the inlet passage is uncovered, and permits the entry of the sterilizing fluid which courses in and about all of the parts within the valve casing and makes its escape through the auxiliary passage 23. The effect of this treatment is to both sterilize and heat the entire valve structure, thus assuring a wholly safe condition of these parts for the passage of the treated milk thereabout in the discharge of the treated batch from the tank. The sterilizing fluid inlet passage 25 is positioned also so that it is closed by the first movement of the valve plug 15 toward open position, thereby cutting off the entry of the sterilizing fluid and permitting final drainage through the auxiliary passage 23 before the opening of the normal passage through the valve casing.

I claim as my invention:

A device of the class described, comprising a casing having a chamber with an upper inlet opening and a lower outlet opening, a reciprocatory valve controlling said inlet opening and having a guiding structure extending into said chamber, a rotary valve controlling said outlet opening, having a U-shaped lateral recess formed therein, an auxiliary passage leading outwardly of said casing independently of said inlet and said outlet openings and having a port in the seat of said rotary valve, a sterilizing fluid inlet passage also having a port in the seat of said rotary valve, a cross member positioned in said recess adapted to engage the guiding structure of said reciprocatory valve and effect the opening of said reciprocatory valve with the opening movement of said rotary valve, said recess being positioned so that said ports are closed by said rotary valve when said valves are in opened position and establishing communication through said recess between said chamber and said ports when said valves are in closed position.

In witness whereof I have hereunto attached my signature.

JOSEPH H. GODFREY.